E. G. ORBOM.
UNIVERSAL JOINT.
APPLICATION FILED JULY 28, 1917.
1,335,913.
Patented Apr. 6, 1920.
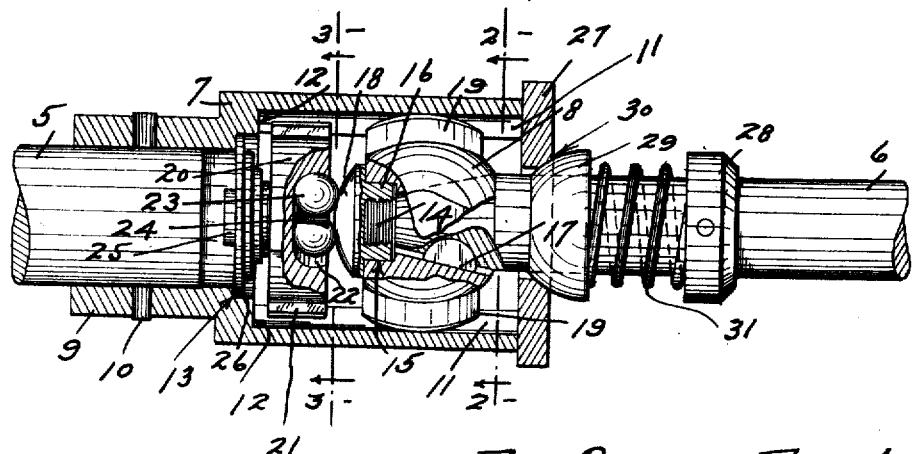
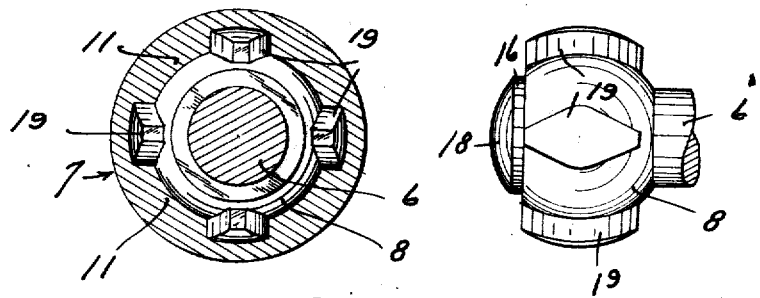
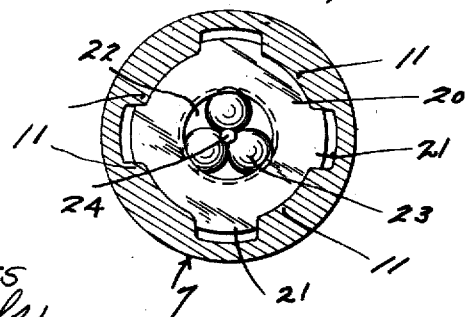
WITNESSES
E. C. Wells
A. H. Opsahl
INVENTOR
E. G. Orbom
BY HIS ATTORNEYS
Williamson Merchant

UNITED STATES PATENT OFFICE.

ERICK GUSTAF ORBOM, OF WILLISTON, NORTH DAKOTA.

UNIVERSAL JOINT.

1,335,913.

Specification of Letters Patent.

Patented Apr. 6, 1920.

Application filed July 28, 1917. Serial No. 183,280.

*To all whom it may concern:*

Be it known that I, ERICK GUSTAF ORBOM, a citizen of the United States, residing at Williston, in the county of Williams and State of North Dakota, have invented certain new and useful Improvements in Universal Joints; and I do hereby declare the following to be a full, clear, and exact description of the invention, such as will enable others skilled in the art to which it appertains to make and use the same.

My invention has for its object to provide a universal joint intended for general use, such as connecting a driving shaft to a driven shaft, but it is more especially adapted for use in connecting such shafts wherein one thereof has a limited axial movement, with respect to the other, for instance in connecting the engine shaft of an automobile with the driving shaft thereof.

To the above end, generally stated, the invention consists of the novel devices and combinations of devices hereinafter described and defined in the claims.

Referring to the drawings,

Figure 1 is a view, partly in elevation and partly in longitudinal central section;

Fig. 2 is a view in transverse section taken on the line 2—2 of Fig. 1;

Fig. 3 is a view in transverse section taken on the line 3—3 of Fig. 1; and

Fig. 4 is a view in elevation of the inner member of the universal joint and connected end of the shaft.

The numerals 5 and 6 indicate two shafts connected by the improved universal joint, one of which shafts may be a driving shaft and the other thereof a driven shaft. The improved universal joint comprises an outer cylindrical member 7 and an inner spherical member 8 fitted, the latter in the former. Said outer joint member 7 has an open outer end and its inner end is contracted to form a sleeve 9 into which the inner end of the shaft 5 is telescoped and rigidly secured thereto by a tapered pin 10. A plurality of wide circumferentially spaced internal clutch teeth 11 are formed in the joint member 7. By reference to Fig. 1, it will be noted that the clutch teeth 11 terminate short of the inner end of the joint member 7, to afford therebetween shoulders or abutments 12. Inward of these abutments 12, the joint member 7 is contracted to afford an annular shoulder or ledge 13.

The joint member 8 is provided with a tapered axial opening into which is fitted the tapered inner end of the shaft 6, which terminates in a screw-threaded stud 14. This stud 14 projects into a cavity 15 formed in the joint member 8. A nut 16 is mounted in the cavity 15, has screw-threaded engagement with the stud 14, and is provided with an annular shoulder, which bears against the flattened inner end of the joint member 8 and securely holds the same on the shaft 6. The shaft 6 and joint member 8 are connected by a key 17 for common rotation. Integrally formed with the outer end of the nut 16, is a spherical bearing head 18, and it will be noted that this head completes the spherical form of the joint member 8 at its flattened inner surface. Meshing with the clutch teeth 11, are coöperating clutch teeth 19 integrally formed with and circumferentially spaced on the joint member 8. The clutch teeth 19 are reversely tapered and have the same curvature as the joint member 8. Obviously, the intermeshing clutch teeth 11 and 19 permit free universal angular and axial sliding movements of the joint members 7 and 8.

Mounted in the joint member 7, between its inner end and the joint member 8, is a traveling thrust block 20, in the form of a disk having radial lugs 21, which project between the clutch teeth 11 and hold said thrust block against rotation, with respect to the joint members 7 and 8, but with freedom for axial sliding movement, with respect thereto. Formed in the front face of the thrust block 20, is a ball-race 22 in which is mounted anti-friction bearing balls 23. A headed pin 24 projects axially from the thrust block 20 and holds the bearing balls 23 in the ball-race 22. Projecting from the rear face of the thrust block 20, is an axially located stud 25. Encircling this stud 25, is a helical spring 26 compressed between the thrust block 20 and the shoulder 13 in the joint member 7 and yieldingly holds the thrust bearing 23 against the joint member 8.

The open outer end of the joint member 7 is closed by a disk-like cover plate 27, of fiber or other suitable material, and has an axial opening through which the shaft 6 loosely projects, with freedom for endwise movement. It will be noted that the cover plate 27 has a diameter considerably larger than that of the joint member 7 and is free for universal sliding movement on said member. Telescoped onto the shaft 6, is a collar 28 and a follower 29, and said collar is secured to the shaft 6 by a pin. The follower 29 has a spherical surface which fits a socket in the cover plate 27 and affords a ball and socket joint 30. A coiled spring 31, encircling the shaft 6, is compressed between the collar 28 and follower 29 and yieldingly presses the said follower onto the cover plate 27, which, in turn, is yieldingly held against the joint member 7.

Obviously, the thrust bearing will take up all loose motion and the spring 26 yieldingly holds the same to its work. The cover plate 27 and ball and socket joint 30 will exclude all dirt and dust from the interior of the universal joint and, at the same time, permit free movement of the members thereof. It is, of course, understood that the joint members may be provided with any desired number of coöperating clutch teeth, depending on the different demands or conditions under which the same is used.

What I claim is:—

1. The combination with two shaft sections, of a universal joint connecting the same, said joint comprising a cylindrical outer member and a spherical inner member, said two members having interlocking clutch teeth arranged to permit universal angular and endwise movement of one of the two shafts with respect to the other, a thrust block mounted in the outer member and interlocked with the clutch teeth thereof with freedom for axial movement with respect to said outer member, roller bearings mounted in a roller seat formed in the thrust block, and a spring yieldingly holding the thrust block with its roller bearings in engagement with the spherical surface of said inner member.

2. The combination with two shaft sections, of a universal joint connecting the same, said joint comprising a cylindrical outer member and a spherical inner member, said two members having interlocking clutch teeth arranged to permit universal angular and endwise movement of one of the two shafts with respect to the other, a thrust block mounted in the outer member and interlocked with the clutch teeth thereof with freedom for axial movement with respect to said outer member, a spring yieldingly holding the thrust block against the inner member, and a positive stop shoulder in the inner member for the thrust block to limit the inward axial movement of the inner member and the compression of the spring.

3. The combination with two shaft sections, of a universal joint connecting the same, said joint comprising a cylindrical outer member and a spherical inner member, said two members having interlocking clutch teeth arranged to permit universal angular and endwise movement of one of the two shafts with respect to the other, a thrust block mounted in the outer member and interlocked with the clutch teeth thereof with freedom for axial movement with respect to said outer member, said inner member having a nut securing the same to the respective shaft and provided with a spherical bearing surface, roller bearings mounted in a roller seat formed in the thrust block, a spring yieldingly holding the thrust block with its roller bearings in engagement with the bearing surface of said nut, and a positive stop shoulder in the outer member for the thrust block to limit the inward axial movement of the outer member and the compression of the spring.

In testimony whereof I affix my signature in presence of two witnesses.

ERICK GUSTAF ORBOM.

Witnesses:
LENA HAUDEN,
WM. G. OWENS.